United States Patent Office 2,969,398
Patented Jan. 24, 1961

2,969,398

SPIRO-TETRAKISHYDROXYALKYL PHOSPHONIUM SALTS

Sheldon A. Buckler, Stamford, Conn., assignor to American Cyanamid Company, New York, N.Y., a corporation of Maine No Drawing. Filed Sept. 26, 1958, Ser. No. 763,479

15 Claims. (Cl. 260—606.5)

The present invention relates to new and useful organophosphorus compounds and to the preparation thereof. More particularly, the instant discovery concerns the spiro-tetrakis(hydroxyalkyl)phosphonium salts in which each of the four carbon atoms directly attached to the phosphorus atom has one OH group attached thereto, these salts corresponding to the formula

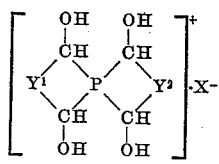

wherein X represents the anion of a water-soluble acid, such as HCl, HBr, HI, $HNO_3$, $H_3PO_4$, $H_2SO_4$, acetic acid, citric acid, tartaric acid and the like; and $Y^1$ and $Y^2$ represent substituted and unsubstituted, saturated and unsaturated, branch and straight chain divalent aliphatic or alkylene groups providing 1 to 5 carbon atoms in the phosphorus-containing ring; substituted and unsubstituted divalent aromatic or arylene groups in which from two to four consecutive ring carbon atoms of the arylene ring provide, respectively, from two to four consecutive carbon atoms in the phosphorus-containing ring; substituted and unsubstituted, saturated and unsaturated divalent alicyclic or cycloalkylene groups in which from two to four consecutive carbon atoms of the cycloalkylene ring provide, respectively, from two to four consecutive carbon atoms in the phosphorus-containing ring. $Y^1$ and $Y^2$ may be the same or different radicals.

Typical substituents on the divalent aliphatic, aromatic or cycloaliphatic groups contemplated herein include halogen, cyano, hydroxyl, carbamyl, acyloxy, carbalkoxy, carboxy, alkyloxy, aryl, aryloxy, and the like.

According to the present invention a dialdehyde of the formula

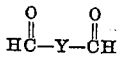

wherein Y represents either $Y^1$ or $Y^2$ in the formula above, is reacted with phosphine and a mineral acid in the presence of water to produce compounds of the type contemplated herein. If desired, also, the reaction may be carried out in the presence of a water-miscible organic medium or solvent. Typical suitable water-soluble media are tetrahydrofuran, lower aliphatic monohydric alcohols, dioxane and the like.

As will be seen hereinafter, products of the instant discovery in which X is an organic anion, such as

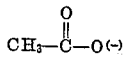

are produced by subjecting the organophosphorus salt of a mineral acid produced as taught above to an exchange reaction with an organic compound capable of exchanging its anion constituent with the anion constituent of the organophosphorus salt. For example, an organophosphorus sulfate of the type contemplated herein may be reacted with barium acetate to produce the corresponding organophosphorus acetate and barium sulfate.

Other typical organic salts capable of giving up their anions to the organophosphorus salts contemplated herein are the acetates of lead, silver, mercury, calcium, and the like. Similarly, —COOH and/or —OH substituted lower alkanoic acid salts, for instance, metal citrates, metal tartrates, such as silver citrate, silver tartrate, and the like, will exchange their alkanoate anion constituents for those of the organophosphorus mineral acid derivatives disclosed above. Although equimolecular proportions of these reactants are generally used, ratios greater than 1:1 are suitable.

Likewise, according to a still further embodiment of the present invention, an organophosphorus chloride prepared as shown above may be converted to its corresponding nitrate by reacting the chloride with silver nitrate and forming the corresponding organophosphorus nitrate and silver chloride.

The dialdehyde and phosphine reactants are employed herein, preferably, in the proportion of two molar equivalents of dialdehyde per molar equivalent of phosphine. However, ratios as high as 10:1 and as low as 2:15, dialdehyde to phosphine, are suitable.

The ratio of mineral acid to phosphine employed is generally at least about 1 molar equivalent of mineral acid per molar equivalent of phosphine, although ratios as high as 20:1 or more, mineral acid to phosphine, are effective. In the case where product anion desired (X) is $\frac{1}{2}SO_4^=$, however, the ratio of $PH_3$ to $H_2SO_4$ must be 1 to 0.5; otherwise, the product anion would be mostly $HSO_4^-$, instead of $\frac{1}{2}SO_4^=$.

It is well to remember, however, that large excesses of readily volatilized mineral acids (e.g. HCl, HBr, etc.) are more tolerable, from the standpoint of product purification, than are large excesses of relatively non-volatile acids, such as $H_2SO_4$, $H_3PO_4$ and the like.

The following is a typical reaction according to the instant invention in which glutaraldehyde is reacted with phosphine and aqueous HCl to produce spiro-1,5,7,11-tetrahydroxy-6-phosphazoniahendecane chloride:

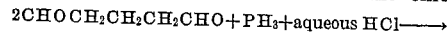
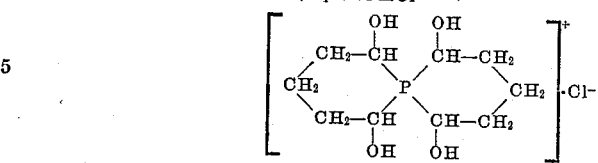

In general the reaction takes place at temperatures in the range from about 0° C. to about 100° C., and preferably from 15° C. to 60° C.

The present discovery will best be understood by reference to the following illustrative examples. The limitations contained in these examples are not to be considered as restrictions upon the scope of the invention, since it will be obvious to one skilled in the art that numerous modifications within the purview of the invention are possible and, by the same token, are contemplated herein.

EXAMPLE I

*Spiro-1,5,7,11-tetrahydroxy-6-phosphazoniahendecane chloride*

A one-liter, three-necked reactor flask was equipped with a gas inlet tube, an addition funnel, a mechanical stirrer and a gas bubbler device so disposed that all exit gases from the flask passed upwardly therethrough, the bubbler device comprising a column containing a two-inch head of water. The reactor flask was charged with a solution mixture of 225 milliliters of tetrahydrofuran and 125 milliliters of a concentrated aqueous solution of hydrochloric acid containing 37.7 percent HCl by weight.

Subsequently, a 20-minute purge of the reactor flask system described above and the solution mixture with nitrogen gas was effected; then for a period of 15 minutes gaseous phosphine at the rate of 50 milliliters per minute was fed into the solution mixture.

Next, while stirring the solution mixture vigorously and maintaining it at a temperature from 25° C.–30° C., 268 grams of an aqueous solution of glutaraldehyde containing 25 percent by weight glutaraldehyde (0.67 mole) was added continuously in the course of 2 hours. During this addition gaseous phosphine was also continuously fed to the solution mixture at a rate to provide a relatively slow stream of bubbles escaping through the bubbler device described above.

The resulting reaction mixture was filtered to remove traces of impurities and the filtrate thus formed was evaporated under reduced pressure, whereby a residue formed which was thoroughly triturated in the presence of acetone, filtered and dried, yielding 59 grams (65 percent of theory) of spiro-1,5,7,11-tetrahydroxy-6-phosphazoniahendecane chloride as a white powder. The compound had a melting point of 166° C.–167° C. and could be recrystallized from either acetic acid or secondary butyl alcohol to give crystals having a melting point of 167°–168° C. *Analysis.*—Calculated for $C_{10}H_{20}ClO_4P$: C, 44.37; H, 7.45; Cl, 13.10; P, 11.44. Found: C, 44.51; H, 7.55; Cl, 13.07; P, 11.58.

EXAMPLE II

*Spiro-1,4,6,9-tetrahydroxy-5-phosphazonianonane chloride*

The one-liter reactor flask equipped as described in Example I, above, was charged with a solution mixture of 200 milliliters of tetrahydrofuran and 200 milliliters of a concentrated aqueous solution of hydrochloric acid containing 37.7 percent HCl by weight. As also described in Example I, above, the system was purged with nitrogen gas and then gaseous phosphine was admitted at the rate of 50 milliliters per minute for 15 minutes.

Next, while stirring the solution mixture vigorously and maintaining it at a temperature from 25° C.–30° C., 107 grams of 2,5-diethoxytetrahydrofuran (0.67 mole) was added continuously in the course of 2 hours. During this addition gaseous phosphine was also introduced into the solution mixture at a rate to provide a relatively slow stream of bubbles escaping through the bubbler device, as described in Example I.

A solid-free reaction mixture resulted which was evaporated under reduced pressure, thus producing a residue which was thoroughly triturated in the presence of 150 milliliters of amyl alcohol and allowed to stand at 0° C. for several hours. The resulting mixture was filtered to remove white solid particulates therefrom which were dried to give 23 grams (34 percent of theory) of a product having a melting point of 84° C.–86° C. Recrystallization of the product from amyl alcohol containing a small amount of HCl gave a product in the form of white needles and having a melting point of 94° C.–95° C. *Analysis.*—Calculated for $C_8H_{16}ClO_4P$: C, 39.60; H, 6.65; Cl, 14.61; P, 12.77. Found: C, 39.46; H, 6.55; Cl, 14.65; P, 12.85.

The reaction in Example II may be illustrated as follows beginning with the stable acetal of succinaldehyde, 2,5-diethoxytetrahydrofuran:

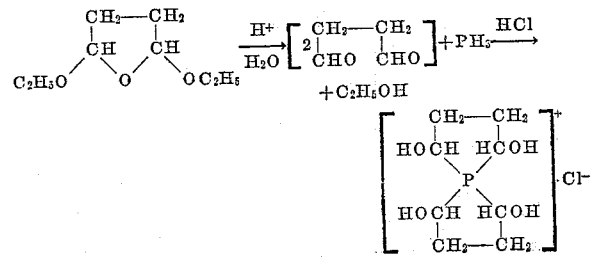

EXAMPLE III

Example II, above, is repeated with the exception that 2,5-diethoxytetrahydrofuran is substituted with a solution of 57.6 grams (0.67 mole) of succinaldehyde in 100 milliliters of water. The same product, spiro-1,4,6,9-tetrahydroxy-5-phosphazonianonane chloride, is produced.

EXAMPLE IV

*Spiro-1,5,7,11-tetrahydroxy-6-phosphazoniahendecane sulfate*

In Example I, above, the reactor flask is charged instead with 200 milliliters of tetrahydrofuran, 125 milliliters of water and 32.9 grams (0.335 mole) of sulfuric acid. Otherwise the reaction is carried out under the conditions given in Example I. The product of the reaction is spiro-1,5,7,11-tetrahydroxy-6-phosphazoniahendecane sulfate corresponding to the formula

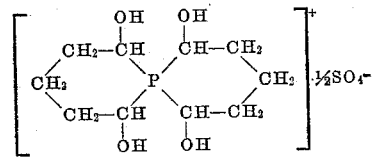

EXAMPLE V

*Spiro-1,5,7,11-tetrahydroxy-6-phosphazoniahendecane hydrogen sulfate*

In Example I, above, the reactor flask is charged instead with 150 milliliters of tetrahydrofuran, 175 milliliters of water and 65.7 grams (0.67 mole) of sulfuric acid. Otherwise the reaction is carried out under the conditions given in Example I. The product of the reaction is spiro-1,5,7,11-tetrahydroxy-6-phosphazoniahendecane hydrogen sulfate corresponding to the formula

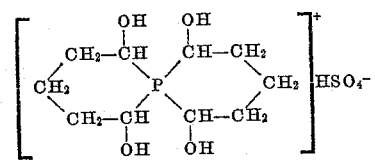

EXAMPLE VI

*Spiro-1,5,7,11-tetrahydroxy-6-phosphazoniahendecane dihydrogen phosphate*

In Example I, above, the reactor flask is charged instead with 200 milliliters of tetrahydrofuran, 125 milliliters of water and 77.2 grams (0.67 mole) of an aqueous solution of phosphoric acid containing 85 percent phosphoric acid by weight. Otherwise the reaction is carried out under the conditions given in Example I. The product of the reaction is spiro-1,5,7,11-tetrahydroxy-6-phosphazoniahendecane dihydrogen phosphate corresponding to the formula

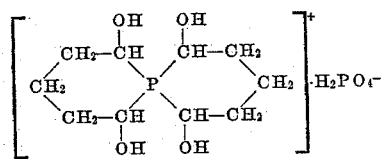

EXAMPLE VII

*Spiro-1,5,7,11-tetrahydroxy-6-phosphazoniahendecane nitrate*

A solution of 27 grams (0.1 mole) of spiro-1,5,7,11-tetrahydroxy-6-phosphazoniahendecane chloride (produced as in Example I, above) in 200 milliliters of water is reacted with a solution of 17 grams of silver nitrate in 75 milliliters of water. Silver chloride precipitates out, the resulting slurry is filtered and the filtrate evaporated to give the product spiro-1,5,7,11-tetrahydroxy-6- phosphazoniahendecane nitrate in solid state and corresponding to the formula

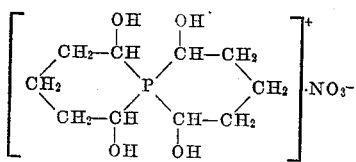

EXAMPLE VIII

*Spiro-1,5,7,11-tetrahydroxy-6-phosphazoniahendecane acetate*

A solution of 28.3 grams (0.1 mole) of spiro-1,5,7,11-tetrahydroxy-6-phosphazoniahendecane sulfate (produced as in Example IV, above) in 200 milliliters of water is reacted with a solution of 12.8 grams (0.05 mole) of barium acetate in 50 milliliters of water. Barium sulfate precipitates out, the resulting slurry is filtered and the filtrate evaporated to give the product spiro-1,5,711-tetrahydroxy-6-phosphazoniahendecane acetate in solid state and corresponding to the formula

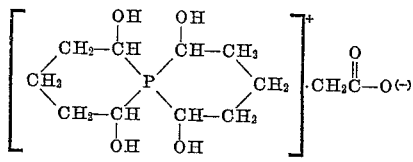

EXAMPLE IX

*Preparation of spiro-1,5,7,11-tetrahydroxy-6-phosphazoniahendecane tartrate*

A solution of 27 grams (0.1 mole) of spiro-1,5,7,11-tetrahydroxy - 6 - phosphazoniahendecane chloride (produced as in Example I, above) in 200 milliliters of water is reacted with a solution of 18.4 grams (0.05 mole) of finely-pulverized silver tartrate suspended in 500 milliliters of water. The mixture is stirred for several hours. Silver chloride precipitates out, the resulting slurry is filtered and the filtrate evaporated to give the product spiro-1,5,7,11-tetrahydroxy-6-phosphazoniahendecane tartrate in solid state and corresponding to the formula

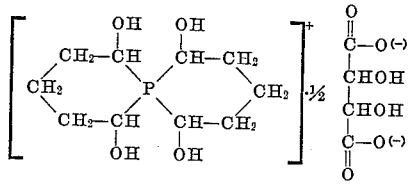

Among other dialdehydes which may be reacted with phosphine under the conditions contemplated herein to produce phosphonium salts which correspond to the formula

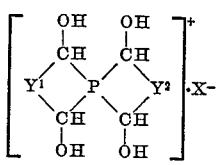

are the following:
3-chloroglutaraldehyde
3-butylsuccinaldehyde
Phthalaldehyde
3-(p-chlorophenyl)glutaraldehyde
3-carbamylglutaraldehyde
2-cyanomalonaldehyde
2-hydroxyadipaldehyde
3-acyloxyglutaraldehyde
4-carboxyphthalaldehyde
2-carbomethoxysuccinaldehyde
3-methoxyadipaldehyde
3-phenoxyphthalaldehyde
3-methyleneglutaraldehyde Typically, (A) ortho-phthalaldehyde and (B) 3-(para-chlorophenyl)glutaraldehyde may be reacted, respectively, with phosphine in a 2:1 molar equivalent ratio as taught herein and under the conditions given in Example I, above, to produce the corresponding phosphonium salts having, respectively, the following structural formulae:

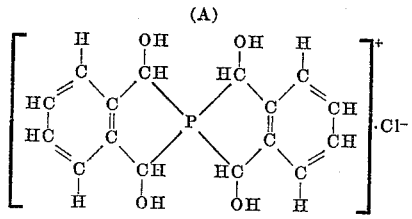

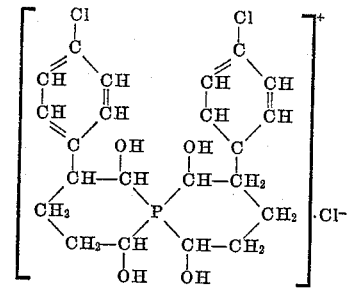

The novel products of the present invention are useful for a number of purposes. For example, the product of Example II, above, when heated above its melting point, say, about 125° C., evolves a gas, expands to several times its original form, and solidifies to a hard resinous material which is quite flame-resistant and has valuable structural properties.

According to still another use, a small amount of the product of Example II, for instance, is admixed with a liquid, viscous polymer, such as the low molecular weight polymer of propylene oxide and toluene di-isocyanate, and the resulting mixture heated in the conventional manner to produce polymeric foams. The novel compounds of the present invention not only contribute to the foaming action but they enhance the flame-resistance properties, and the like, of the final polymeric product.

Clearly, the instant discovery encompasses numerous modifications within the skill of the art. Furthermore, while the present invention has been described in detail with respect to specific embodiments thereof, it is not intended that these details be construed as limitations upon the scope of the invention, except insofar as they appear in the appended claims.

I claim:
1. Organophosphorus salts of the general formula

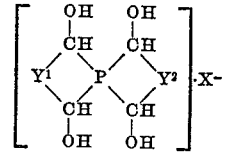

wherein X represents a member selected from the group consisting of the anion of a mineral acid and a substituted and unsubstituted lower alkanoic acid anion, said substituents being selected from the group consisting of —COOH and —OH; $Y^1$ and $Y^2$ each represent a member selected from the class consisting of substituted and unsubstituted alkylene groups and substituted and unsubstituted arylene groups, said alkylene groups providing 1 to 5 carbon atoms in the phosphorus-containing ring, said alkylene groups being the alkylene moieties intermediate the —CHO moieties in any of the compounds selected from the group consisting of glutaraldehyde, succinaldehyde, malonaldehyde and adipaldehyde, said substituents on the alkylene groups being selected from the group consisting of halogen, cyano, hydroxyl, carbamyl, acyloxy, carbalkoxy, carboxy, alkyloxy, aryl and aryloxy, and said arylene groups having rings from which 2 to 4 consecutive ring carbon atoms thereof provide, respectively, from 2 to 4 consecutive carbon atoms in the phosphorus-containing ring, the substituents on said substituted arylene groups being selected from the group consisting of halogen, cyano, hydroxyl, carbamyl, acyloxy, carbalkoxy, carboxy, alkyloxy, aryl and aryloxy.

2. The organophosphorus salt of claim 1 wherein $Y^1$ and $Y^2$ represent substituted and unsubstituted phthalaldehyde, the substituents being selected from the group consisting of halogen, cyano, hydroxyl, carbamyl, acyloxy, carbalkoxy, carboxy, alkyloxy, aryl and aryloxy.

3. A spiro-1,5,7,11 - tetrahydroxy-6-phosphazoniahendecane salt in which the anion of the salt is that of a member selected from the group consisting of the anion of a mineral acid and a substituted and unsubstituted lower alkanoic acid anion, said substituents being selected from the group consisting of —COOH and —OH.

4. Spiro-1,5,7,11 - tetrahydroxy - 6 - phosphazoniahendecane chloride.

5. Spiro-1,5,7,11 - tetrahydroxy - 6 - phosphazoniahendecane sulfate.

6. Spiro-1,5,7,11 - tetrahydroxy - 6 - phosphazoniahendecane acetate.

7. A spiro-1,4,6,9-tetrahydroxy-5-phosphazonianonane salt in which the anion of the salt is that of a member selected from the group consisting of the anion of a mineral acid and a substituted and unsubstituted lower alkanoic acid anion, said substituents being selected from the group consisting of —COOH and —OH.

8. A spiro-1,4,6,9 - tetrahydroxy - 5 - phosphazonianonane chloride.

9. Spiro-1,4,6,9-tetrahydroxy - 5 - phosphazonianonane sulfate.

10. Spiro-1,4,6,9-tetrahydroxy - 5 - phosphazonianonane acetate.

11. A process for producing an organophosphorus salt of the general formula

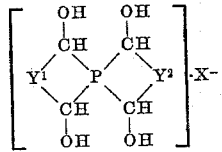

wherein X represents a member selected from the group consisting of the anion of a mineral acid and a substituted and unsubstituted lower alkanoic acid anion, said substituents being selected from the group consisting of —COOH and —OH; $Y^1$ and $Y^2$ each represent a member selected from the class consisting of substituted and unsubstituted alkylene groups and substituted and unsubstituted arylene groups, said alkylene groups providing 1 to 5 carbon atoms in the phosphorus-containing ring, said alkylene groups being the alkylene moieties intermediate the —CHO moieties in any of the compounds selected from the group consisting of glutaraldehyde, succinaldehyde, malonaldehyde and adipaldehyde, said substituents on the alkylene groups being selected from the group consisting of halogen, cyano, hydroxyl, carbamyl, acyloxy, carbalkoxy, carboxy, alkoxy, aryl and arlyoxy, and said arylene groups having rings from which 2 to 4 consecutive ring carbon atoms thereof provide, respectively, from 2 to 4 consecutive carbon atoms in the phosphorus-containing ring, the substituents on said substituted arylene groups being selected from the group consisting of halogen, cyano, hydroxyl, carbamyl, acyloxy, carbalkoxy, carboxy, alkyloxy, aryl and aryloxy; which comprises bringing an aldehyde of the formula

wherein Y has the same meaning as $Y^1$ and $Y^2$, respectively, in the above formula, into contact with phosphine and a mineral acid in the presence of water and recovering the thus-formed corresponding organophosphorus salt.

12. The process of claim 11 wherein $Y^1$ and $Y^2$ represent substituted and unsubstituted phthalaldehyde, the substituents being selected from the group consisting of halogen, cyano, hydroxyl, carbamyl, acyloxy, carbalkoxy, carboxy, alkyloxy, aryl, and aryloxy.

13. The process of claim 11 in which the reaction is carried out at a temperature in the range of about 0° C to about 100° C.

14. The process of claim 11 in which the reaction is carried out in the presence of an inert organic solvent.

15. The process wherein the organophosphorus salt produced in claim 11 is reacted with the salt of a lower alkanoic acid, substituted and unsubstituted, said substituents being selected from the group consisting of —COOH and —OH, and said salt being capable of replacing X with its own anion to form the corresponding organophosphorus salt.

No references cited.